US011528972B2

(12) United States Patent
Leguillou et al.

(10) Patent No.: US 11,528,972 B2
(45) Date of Patent: Dec. 20, 2022

(54) LUGGAGE SHELL, LUGGAGE COMPRISING SUCH A SHELL, AND METHOD FOR MANUFACTURING A LUGGAGE SHELL

(71) Applicant: LOUIS VUITTON MALLETIER, Paris (FR)

(72) Inventors: Olivier Leguillou, Saint Clair du Rhone (FR); Guillaume Vannier, Paris (FR)

(73) Assignee: Louis Vuitton Malletier, Paris (FR)

( * ) Notice: Subject to any disclaimer, the term of this patent is extended or adjusted under 35 U.S.C. 154(b) by 625 days.

(21) Appl. No.: 16/072,713

(22) PCT Filed: Feb. 15, 2017

(86) PCT No.: PCT/FR2017/050344
§ 371 (c)(1),
(2) Date: Jul. 25, 2018

(87) PCT Pub. No.: WO2017/140982
PCT Pub. Date: Aug. 24, 2017

(65) Prior Publication Data
US 2019/0059535 A1   Feb. 28, 2019

(30) Foreign Application Priority Data
Feb. 19, 2016   (FR) ...................................... 16 51384

(51) Int. Cl.
*A45C 5/02*   (2006.01)
*A45C 13/08*   (2006.01)
(Continued)

(52) U.S. Cl.
CPC .................. *A45C 5/02* (2013.01); *A45C 5/03* (2013.01); *A45C 13/005* (2013.01); *A45C 13/08* (2013.01);
(Continued)

(58) Field of Classification Search
CPC ........... A45C 5/02; A45C 5/03; A45C 13/005; A45C 13/08; A45C 13/103; A45C 13/36;
(Continued)

(56) References Cited

U.S. PATENT DOCUMENTS 2,410,681 A * 11/1946 Rayburn ................ B65D 25/14
206/524.2
2,768,460 A * 10/1956 Northrup .................. G09F 3/02
40/615
(Continued)

FOREIGN PATENT DOCUMENTS

| CN | 2914772 Y | 6/2007 |
|---|---|---|
| CN | 103494412 A | 1/2014 |

(Continued)

OTHER PUBLICATIONS

International Search Report related to Application No. PCT/FR2017/050344 dated Jun. 12, 2017.

*Primary Examiner* — Tri M Mai
(74) *Attorney, Agent, or Firm* — von Briesen & Roper, s.c.

(57) ABSTRACT

A luggage shell comprising a structure having a general shell shape defining an internal volume and formed of a material comprising plastic or a composite material, and at least one covering sheet fixed on an outer surface of the structure, said covering sheet being of metal and having a thickness of between 25 μm and 1 mm.

12 Claims, 6 Drawing Sheets

(51) Int. Cl.
  *A45C 13/36* (2006.01)
  *A45C 5/03* (2006.01)
  *A45C 13/00* (2006.01)
  *A45C 13/10* (2006.01)
  *B32B 7/12* (2006.01)
  *B32B 15/08* (2006.01)
  *B32B 15/18* (2006.01)
  *B32B 15/20* (2006.01)
  *B29D 22/00* (2006.01)
  *B29K 23/00* (2006.01)

(52) U.S. Cl.
  CPC ............ *A45C 13/103* (2013.01); *A45C 13/36* (2013.01); *B32B 7/12* (2013.01); *B32B 15/08* (2013.01); *B32B 15/18* (2013.01); *B32B 15/20* (2013.01); *A45C 2005/037* (2013.01); *B29D 22/003* (2013.01); *B29K 2023/12* (2013.01); *B32B 2439/00* (2013.01)

(58) Field of Classification Search
  CPC ..... A45C 2005/037; B32B 7/12; B32B 15/08; B32B 15/18; B32B 15/20; B29D 22/003; B29K 2023/03; B29K 2023/12
  See application file for complete search history.

(56) References Cited

U.S. PATENT DOCUMENTS

| | | | | |
|---|---|---|---|---|
| 3,035,735 A | * | 5/1962 | Presnick | B65D 7/00 220/62 |
| 3,464,842 A | * | 9/1969 | Werner | C09J 7/38 428/195.1 |
| 4,061,817 A | * | 12/1977 | Maxel | A45C 5/02 442/268 |
| 5,219,075 A | † | 6/1993 | White | |
| 2005/0127564 A1 | * | 6/2005 | Van Der Aa | B29C 45/14754 264/266 |
| 2008/0017284 A1 | * | 1/2008 | Omura | C22C 38/24 148/593 |
| 2009/0008202 A1 | * | 1/2009 | Dayton | G09F 3/08 190/100 |
| 2009/0038901 A1 | † | 2/2009 | Pomerantz | |
| 2012/0261042 A1 | * | 10/2012 | Khubani | A45C 13/005 150/143 |
| 2014/0008164 A1 | | 1/2014 | Lai | |
| 2015/0321446 A1 | * | 11/2015 | Su | B32B 38/145 428/35.8 |
| 2016/0021994 A1 | | 1/2016 | Chen | |

FOREIGN PATENT DOCUMENTS

| | | | |
|---|---|---|---|
| CN | 203457933 | † | 3/2014 |
| DE | 8628340 U1 | | 12/1986 |
| GB | 1210959 | † | 11/1970 |
| JP | S 5964028 U | | 4/1984 |
| JP | H 069520 U | | 2/1994 |
| JP | 3072068 U | | 7/2000 |
| JP | 2002253320 | † | 9/2002 |
| JP | 2003116622 A | | 4/2003 |
| JP | 2004024433 | † | 1/2004 |
| JP | 2004024433 A | | 1/2004 |
| JP | 2014008317 A | | 1/2014 |
| JP | 2015213602 A | | 12/2015 |
| TW | 200838448 A | | 10/2008 |
| WO | 0160601 | † | 8/2001 |
| WO | WO 2008/011327 A2 | | 1/2008 |
| WO | WO 2011/127784 A1 | | 10/2011 |
| WO | 2012056035 | | 5/2012 |

\* cited by examiner
† cited by third party

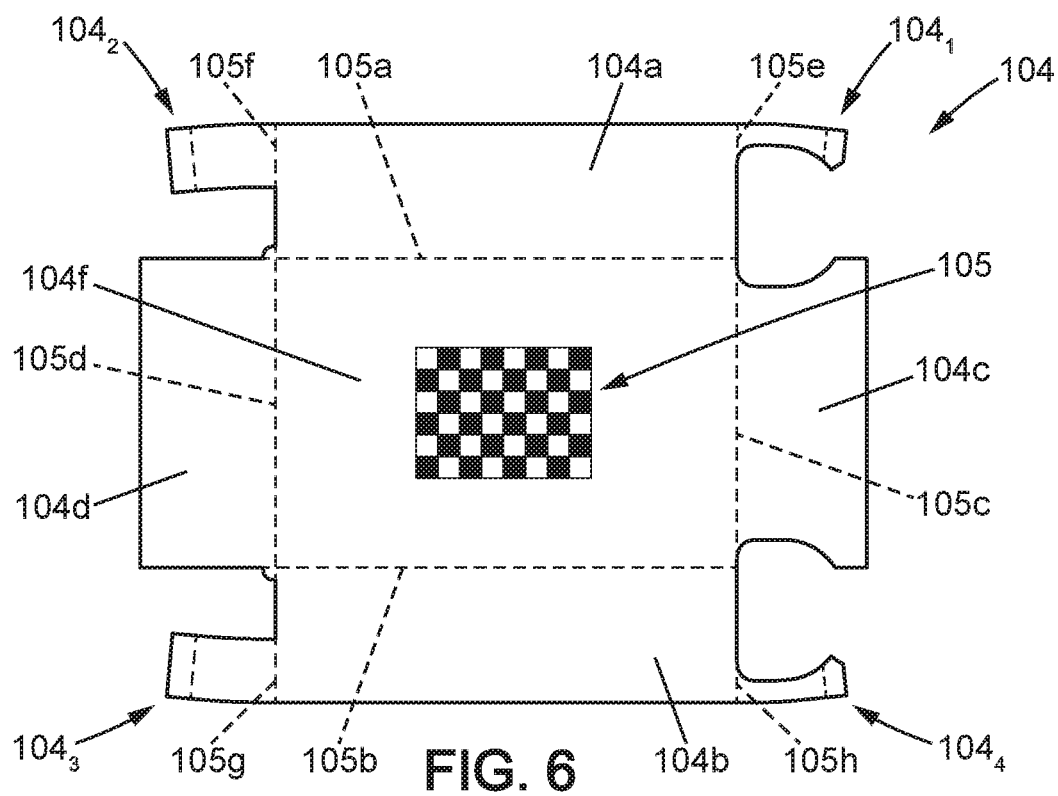
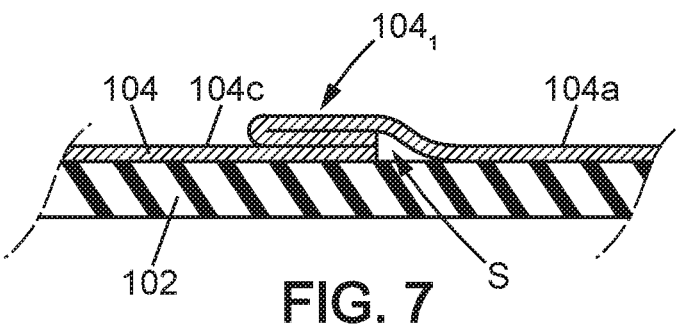
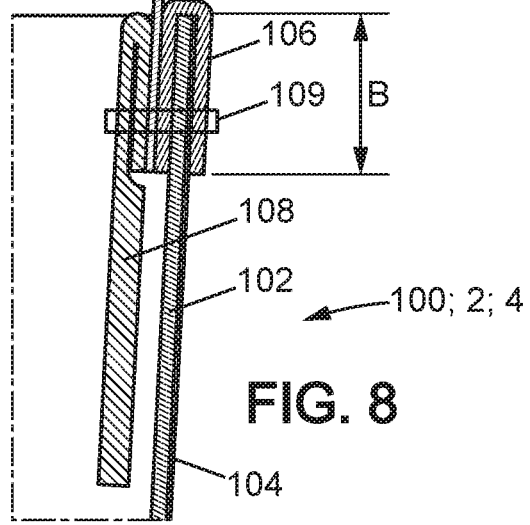

LUGGAGE SHELL, LUGGAGE COMPRISING SUCH A SHELL, AND METHOD FOR MANUFACTURING A LUGGAGE SHELL

CROSS-REFERENCE TO RELATED APPLICATION

This Application is a 35 USC § 371 US National Stage filing of International Application No. PCT/FR2017/050344 filed on Feb. 15, 2017, and claims priority under the Paris Convention to French Patent Application No. 16 51384 filed on Feb. 19, 2016.

FIELD OF THE DISCLOSURE

The present invention relates to a luggage shell and to its manufacture.

BACKGROUND OF THE DISCLOSURE

There are many types of luggage comprising a container composed of a first shell and a second shell which are substantially rigid, and a zipper fastener or a frame for connecting said shells in a closed position, and defining an internal volume in which a user can store items for transport, particularly clothing.

A first type of luggage has plastic luggage shells. These shells are semi-rigid. Their main advantage is that they are light. Because their manufacturing process involves molding, it is possible to obtain aesthetic rounded shapes and it is possible to have colored decoration on the surface. They are not very resistant to deformation, however.

A second type of luggage has metal luggage shells, usually composed of aluminum plates or sheets. Generally, these sheets are quite thick, between 1.5 mm and 2 mm. Luggage made with these sheet metal shells is very resistant mechanically but is much heavier than plastic luggage, and because of the manufacturing processes commonly used, they have the disadvantage of being limited by the range of shapes these shells can cover: the shapes are typically very rectangular and with little decoration because the sheets are made by a stamping process using a die which cannot provide many fine details.

SUMMARY OF THE DISCLOSURE

The object of the present invention is to provide a different type of luggage.

The invention relates to a luggage shell comprising:
a structure having a general shell shape defining an internal volume and formed of a material comprising plastic, and
at least one covering sheet fixed on an outer surface of the structure, said covering sheet being of metal and having a thickness of between 25 µm and 1 mm.

Due to these arrangements, the luggage shell is light and mechanically resistant while being highly aesthetic.

In various embodiments of the luggage shell according to the invention, one or more of the following arrangements may also possibly be used.

According to a variant of the shell of the invention, the covering sheet has a thickness of between 25 µm and 0.6 mm, and preferably between 25 µm and 0.3 mm.

According to a variant of the shell of the invention, the covering sheet is made of a material chosen from a list of metals comprising titanium, stainless steel, and aluminum.

According to a variant of the shell of the invention, the material of the structure comprises a plastic of the thermoplastic or thermosetting type.

According to a variant of the shell of the invention, the material of the structure comprises a filler incorporated into the plastic, said filler being in the form of fibers.

According to a variant of the shell of the invention, the fibers are plastic fibers or glass fibers or carbon fibers.

According to a variant of the shell of the invention, the luggage shell comprises a single covering sheet formed by folding a flat sheet having an outline adapted so that, after folding, the covering sheet has a shape substantially identical to the outer surface of the structure.

According to a variant of the shell of the invention, the outline is a cross shape.

According to one aspect of the shell of the invention, the outline is adapted so that, after folding, the covering sheet has a shape which covers all the flat and semi-cylindrical portions of the outer surface of the structure.

According to a variant of the shell of the invention, the outline is adapted so that, after folding, the covering sheet has a shape which covers all the flat portions of the outer surface of the structure.

According to a variant of the shell of the invention, the flat sheet comprises at least:
a substantially rectangular main portion intended to cover an external main face of the structure, located opposite to an opening of the structure,
a first side portion extending from the main portion and intended to cover a first side face of the structure,
a second side portion extending from the main portion and intended to cover a second side face of the structure, and
at least one wing extending laterally from an end remote from the main portion, and which is adapted to meet the second side portion when said flat sheet is folded to form the covering sheet.

According to a variant of the shell of the invention, the covering sheet is formed by folding prior to being fixed to the structure.

The invention also relates to a luggage item comprising at least a first luggage shell having the above characteristics.

The luggage item advantageously comprises:
a first luggage shell and a second luggage shell having the above characteristics.
a hinge device connecting the first luggage shell and the second luggage shell, the second luggage shell being movable relative to the first luggage shell between a closed position and an open position by means of the hinge device,
a zipper fastener comprising a first strip connected to the first luggage shell, a second strip connected to the second luggage shell, and a slide that is movable along said first and second strips between:
a fastening position in which the first and second strips are held adjacent to one another, the hinge device then being in the closed position, and
an releasing position in which the first and second strips are released from one another.

The invention also relates to a method for manufacturing a luggage shell, comprising the steps of:
molding a structure having a general shell shape defining an internal volume and formed of a material comprising plastic, and
fixing at least one covering sheet to an outer surface of the structure, said covering sheet being of metal and having a thickness of between 25 µm and 1 mm.

In various embodiments of the method according to the invention, one or more of the following arrangements may also possibly be used.

According to a variant of the method, a single covering sheet is created from a flat sheet having an outline adapted so that, after folding, the covering sheet has a shape substantially identical to the outer surface of the structure.

According to a variant of the method, the covering sheet is shaped by folding before being fixed to the structure.

According to a variant of the method, the flat sheet comprises at least:
- a substantially rectangular main portion intended to cover an external main face of the structure, located opposite to an opening of the structure,
- a first side portion extending from the main portion and intended to cover a first side face of the structure,
- a second side portion extending from the main portion and intended to cover a second side face of the structure, and
- at least one wing extending laterally from an end remote from the main portion, and which is adapted to meet the second side portion when said flat sheet is folded to form the covering sheet.

According to a variant of the method, the wing and the second side portion are brought together by a joining process in which:
- the end of the wing is folded onto itself to form a folded portion, and
- said folded portion is fixed on a part of the second portion.

According to a variant of the method, the covering sheet has a thickness of between 25 µm and 0.6 mm, and preferably between 25 µm and 0.3 mm.

According to a variant of the method, the covering sheet is made of a material chosen from a list of metals comprising titanium, stainless steel, and aluminum.

BRIEF DESCRIPTION OF THE DRAWINGS

Other features and advantages of the invention will become apparent from the following description of at least one of its embodiments, given as a non-limiting example with reference to the accompanying drawings.

In the drawings:

FIG. 6 is a view of a covering sheet in its flat form, before folding, to be used to cover the luggage shell of FIG. 4;

FIG. 7 is a cross-sectional view along line VII-VII in FIG. 4;

FIG. 8 is a cross-sectional view along line VIII-VIII in FIG. 4;

In the various figures, the same numerical references designate identical or similar elements.

DETAILED DESCRIPTION OF THE DISCLOSURE

The figures illustrate a luggage item essentially comprising a container 3, a zipper fastener 10, and a locking device 30.

Figure 1:
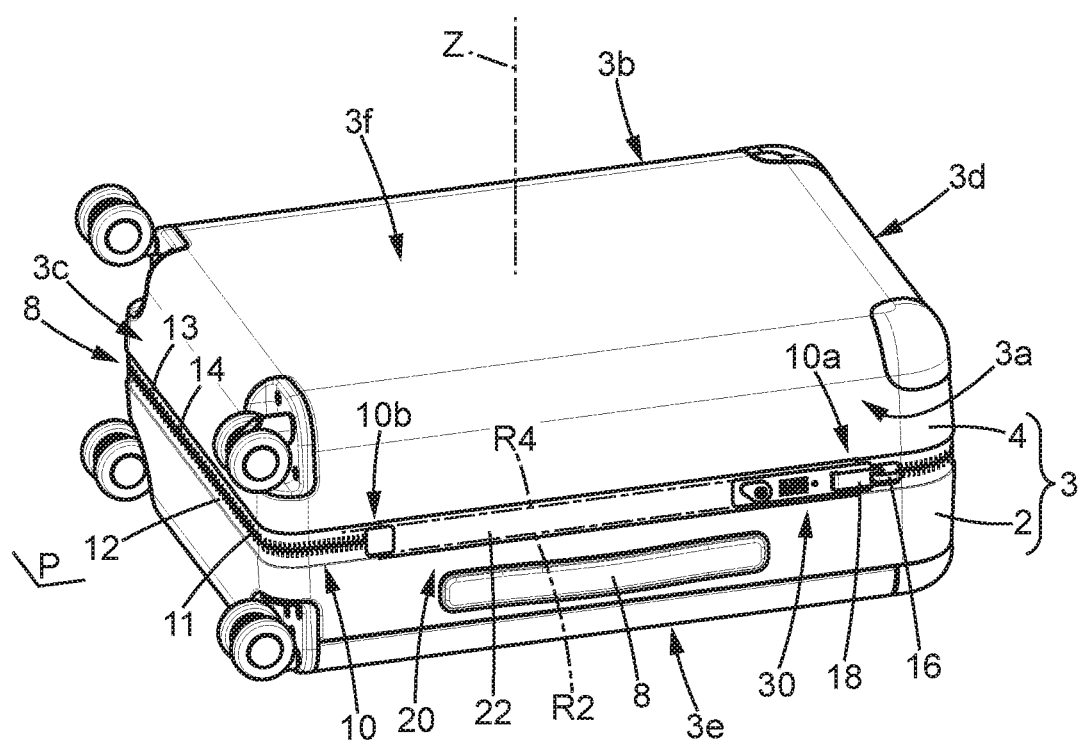
FIG. 1 is a perspective view of a luggage item in the closed position.

In the illustrated embodiment, the luggage item defines a suitcase 1. The container 3 comprises a first shell 2 and a second shell 4 which are connected by a hinge device 20. The first shell 2 and the second shell 4 are relatively rigid. In addition, as illustrated in FIG. 1, the container 3 is substantially parallelepipedic. It comprises two large side faces 3a, 3b, two small side faces 3c, 3d, a lower main face 3e, and an upper main face 3f, each of its surfaces being substantially flat.

Additionally and optionally, the suitcase 1 comprises wheels at the four corners of side face 3c and a telescopic handle capable of projecting from side face 3d. The suitcase 1 further comprises a main carrying handle 8 arranged on large side face 3a. In FIG. 1, the suitcase 1 is illustrated in the position in which it is intended to lie on the ground when opening, resting on its lower face 3e.

The container 3 defines an internal volume 6 intended to receive items for transport, in particular clothing.

Figure 2:
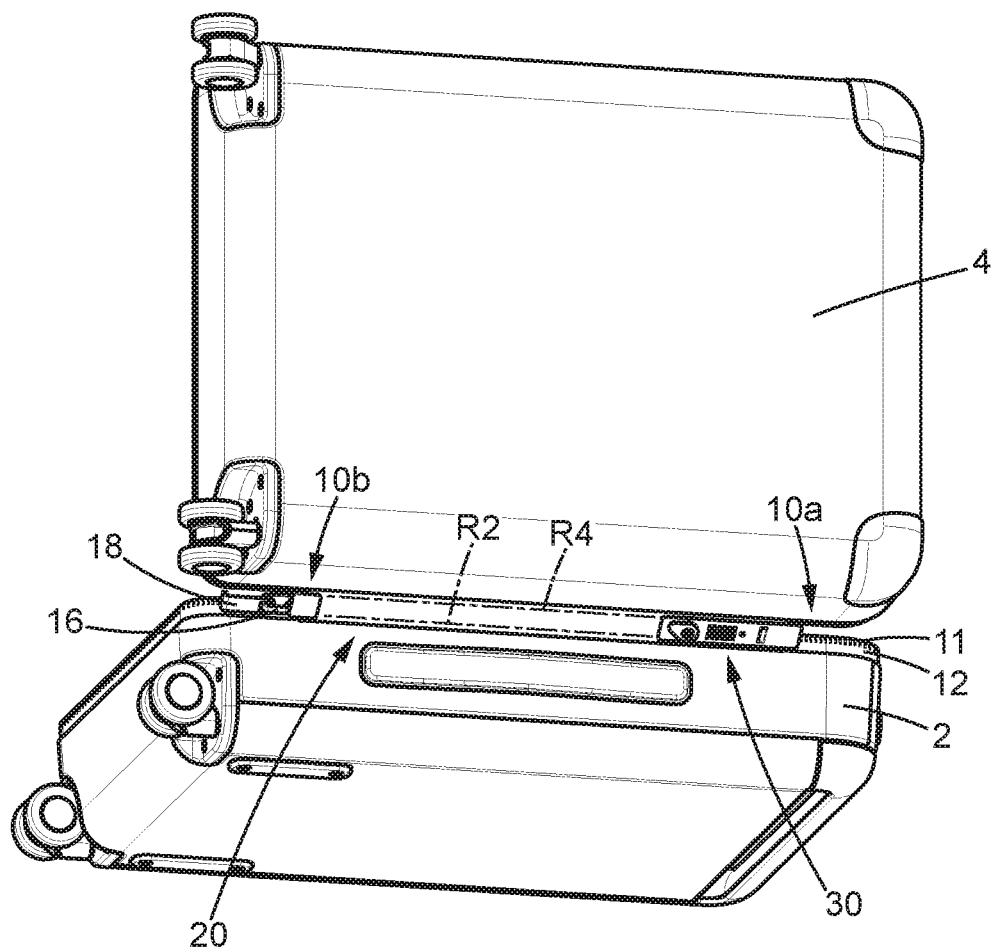
FIG. 2 is a perspective view of the luggage item in the open position.
Figure 3:
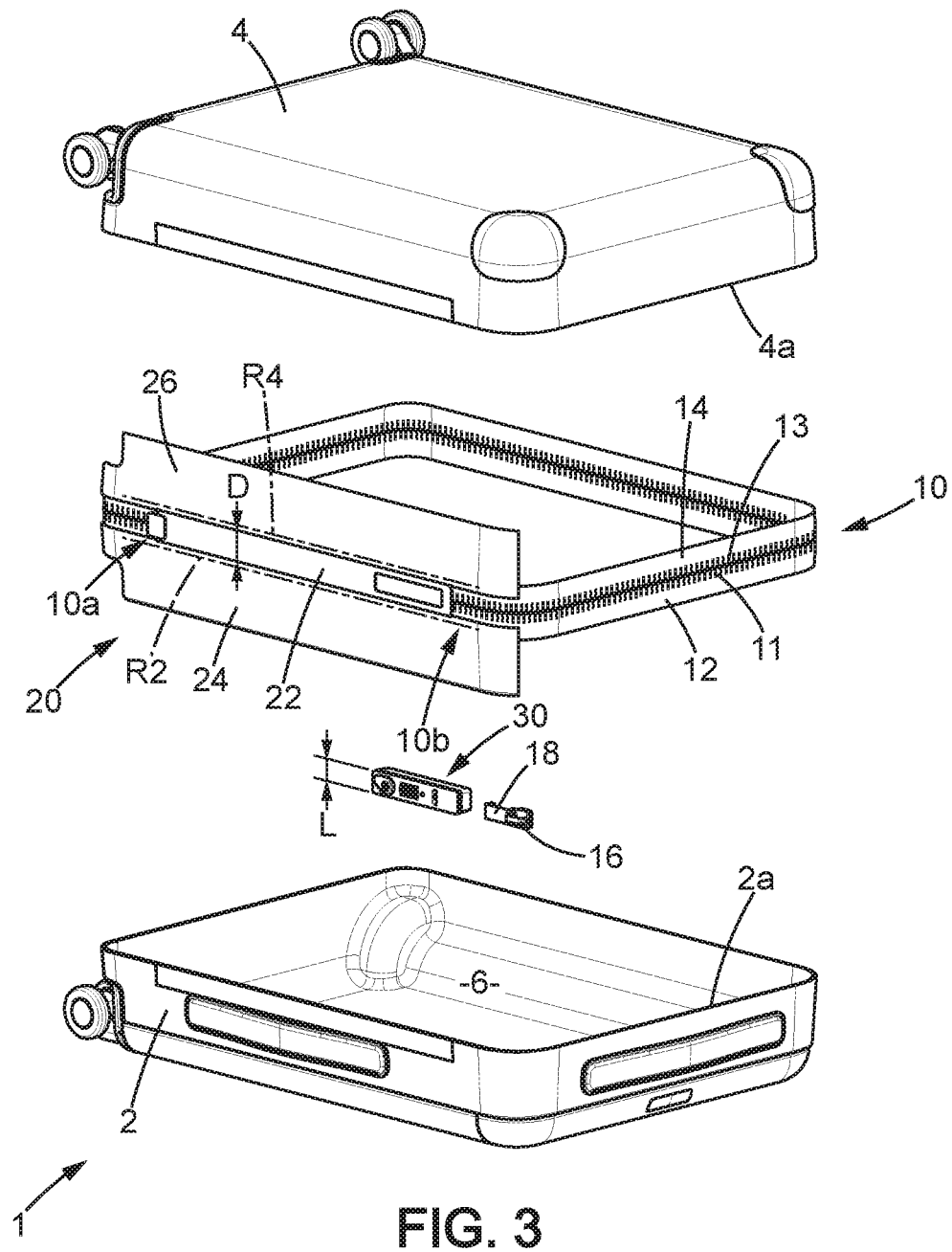
FIG. 3 is an exploded perspective view of the luggage item.

The first shell 2 and the second shell 4 are connected by a hinge device 20 enabling movement of the first shell 2 and second shell 4 relative to one another between a closed position illustrated in FIG. 1 and an open position illustrated in FIG. 2. In the closed position illustrated in FIG. 1, the second shell 4 is facing the first shell 2. The second shell 4 has an edge 4a that is in general contact with an edge 2a of the first shell 2 along a joining plane P. In the open position, there is a passage between the first shell 2 and the second shell 4 to allow access to the internal volume 6 for placement of effects therein.

The hinge device 20 is arranged at large side face 3a and essentially comprises a first support 24 fixed to the first shell 2, a second support 26 fixed to the second shell 4, and an intermediate element 22 extending between the first support 24 and the second support 26. The first support 24 and the second support 26 may also be formed in the respective structures of the first shell 2 and second shell 4, which may for example each be molded as a single piece. The intermediate element 22 is hinged so as to rotate relative to the first support 24, and consequently to the first shell 2, about a first hinge axis R2. The intermediate element 22 is hinged so as to rotate relative to the second support 26, and consequently to the second shell 4, about a second hinge axis R4. The first hinge axis R2 and the second hinge axis R4 both extend parallel to the joining plane P and substantially at the level of large side face 3a in the closed position of the suitcase 1. The first hinge axis R2 and the second hinge axis R4 are therefore parallel and distanced from one another by a distance D. Alternatively, other types of hinge device could be used.

In the closed position, distance D extends along an elevation direction Z perpendicular to the joining plane P and parallel to large side face 3a.

In the closed position, the zipper fastener 10 extends between a first longitudinal end 10a and a second longitudinal end 10b. The first longitudinal end 10a and the second longitudinal end 10b are both located in large side face 3a. Between the first longitudinal end 10a and the second longitudinal end 10b, the zipper fastener extends along the joining plane across side faces 3d, 3b, 3c.

The zipper fastener 10 comprises a first strip 12 having a first longitudinal edge 11, a second strip 14 having a second longitudinal edge 13, a slide 16, and a pull tab 18. The slide 16 is adapted to move between a fastening position in which it is near the first longitudinal end 10a and a releasing position in which it is near the second longitudinal end 10b.

When the slide 16 is in the fastening position, the first longitudinal edge 11 is held adjacent to the second longitudinal edge 13. For this purpose, the first longitudinal edge 11 and the second longitudinal edge 13 are provided with complementary teeth arranged so as to alternate along the first longitudinal edge 11 and along the second longitudinal edge 13, in a manner that is well known. Alternatively, other zipper fastener types or frames could be used.

When the slide 16 is in the releasing position, the first longitudinal edge 11 is released relative to the second longitudinal edge 13 between the first longitudinal end 10a and the second longitudinal end 10b.

When the slide 16 is in the fastening position, the suitcase is held in the closed position of FIG. 1, the second shell 4 being in contact with the first shell 2 so that the internal volume 6 is enclosed, preventing access to it. When the slide 16 is in the releasing position, the second shell 4 can be moved between the open position and the closed position by means of the hinge device 20, as described above.

Figure 4:
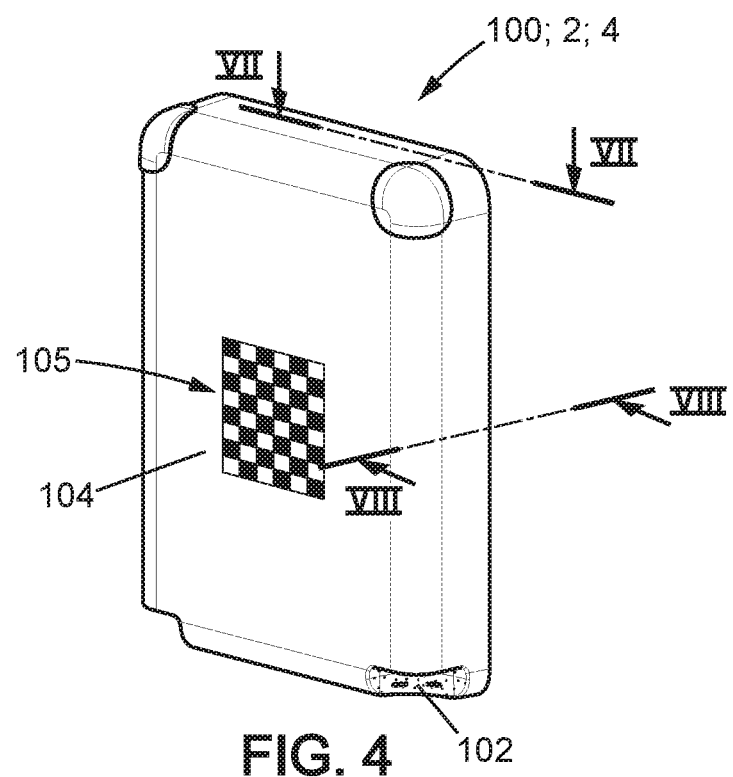
FIG. 4 is a perspective view of a first embodiment of a luggage shell according to the invention.

In accordance with the invention, the first shell 2 and/or the second shell 3 are now referred to more generally by the terms "shell" or "luggage shell" and denoted 100, as the new arrangements described below can be applied to one and/or the other of the two luggage shells. This shell 100 is represented in FIG. 4 and beyond. The shell 100 comprises a structure 102 and at least one covering sheet 104 fixed on an outer surface 102s of the structure 102.

The structure 102 is a part having a general shell shape, for example substantially parallelepipedic with four side faces 102a, 102b, 102c, 102d, an external main face 102f, and an opening 102e facing away from (opposite to) the main face 102f. These faces correspond to faces 3a to 3f defined for the container 3 of the suitcase 1. This structure 102 thus defines an internal volume which is a portion of the internal volume 6 of the suitcase 1. This volume is therefore accessible via the opening 102e. The outer surface 102s is then on the external main face 102f and opposite to the opening 102e. This structure 102 is formed of a material comprising a plastic.

The material of the structure 102 comprises a plastic which is either of the thermoplastic type such as polypropylene PP or polycarbonate PC, or of the thermosetting type. This material gives the shape and much of the robustness or mechanical strength of the shell. It has the advantage of being light, economical, and easily shaped by a molding process.

The material of the structure 102 may be a composite material which comprises, in addition to the plastic, additional filler incorporated in the plastic. In such a case, it is customary to designate the plastic as a plastic "matrix" to indicate that the plastic is not the only component of the material. The filler is, for example, in the form of powder or of fibers which reinforce the material (combination of plastic and fibers).

The mechanical strength of the structure 102 and therefore of the shell 100 is thus improved. The fibers of the filler may be plastic fibers, glass fibers, or carbon fibers, or may be natural fibers. For example, the material of the structure 102 is a self-reinforced polypropylene, or SRPP, which is a polypropylene matrix incorporating fibers which are themselves of polypropylene.

The covering sheet 104 is made of thin metal so that it can be easily shaped, meaning of a thickness between 25 μm and 1 mm.

This metal covering sheet 104 provides the shell with improved strength and impact resistance compared to known luggage shells composed solely of plastic. Conversely, the shell of this composition is lighter than luggage shells made primarily of metal with sheets several millimeters thick. In addition, this covering sheet 104 gives an aesthetic appearance that is more pleasing to the user in comparison to known luggage shells composed solely of plastic.

The covering sheet 104 may have a thickness in the range of 25 μm to 0.6 mm, or preferably between 25 μm and 0.3 mm. This lower thickness facilitates the shaping of this covering sheet 104 in order to adapt it to the structure 102 to which it is fixed. In particular, this lower thickness allows shaping by easier and cleaner deformations achieved by folding or cutting. The luggage shell so constituted is also more aesthetic.

The covering sheet 104 is made of metal (or more generally a metal alloy) of a material which is, for example, titanium or stainless steel or aluminum. Stainless steel has the greatest mechanical strength with a Young's modulus of approximately 210 GPa, followed by titanium with a Young's modulus of approximately 110 GPa. Aluminum is the most malleable material, with a Young's modulus of approximately 70 GPa. Titanium thus offers a good compromise of mechanical strength and a highly aesthetic appearance of the metal.

The covering sheet 104 comprises at least one substantially flat main portion 104f, adapted to cover the main external face 102f of the structure 102 and thus form the upper main face 3f of the luggage container 3.

The main portion 104f and possibly other portions of the covering sheet 104 may comprise decoration 105 to improve the aesthetic. This decoration 105 may be formed on the covering sheet 104 before being fixed on the outer surface 102s of the structure 102, and even before any other shaping (deformation), such as any folding of the covering sheet 104: the decoration 105 may therefore be formed while the covering sheet 104 is in the form of a flat sheet as shown in FIG. 6. The thinness of the covering sheet 104 according to the invention makes it possible not to damage the decoration 105 during shaping subsequent to the creation of said decoration 105. The decoration may be formed by any known technique for sheet metal transformation, for example embossing, engraving, cutting, laser cutting, punching.

Laser cutting is advantageous because it allows cutting precise dimensions with a clean cutting edge without burrs. In addition, laser cutting does not change the color of the material, even at the edge. The aesthetic appearance of the covering sheet 104 is thus preserved.

The covering sheet 104 is fixed to the structure 102 by any means, for example by bonding using an adhesive product deposited on the outer surface 102s of the structure 102, or deposited on a surface of the covering sheet to be adhered to the outer surface 102s of the structure 102, or a double-sided adhesive film placed on said outer surface 102s of the structure.

The adhesive product or adhesive film sets and achieves adhesion either after a first predetermined duration at room temperature or after a second predetermined duration at a crosslinking temperature. The crosslinking temperature of the adhesive product may be obtained in an oven or by magnetic induction in the covering sheet 104. This latter method of magnetic inductive heating has the advantage of being localized to the adhesive product or the adhesive film and to offer better control of the intensity. The bonding is thus more effective while avoiding deformation or deterioration of the structure 102 and avoiding damage to the aesthetic appearance of the covering sheet 104.

Figure 5:
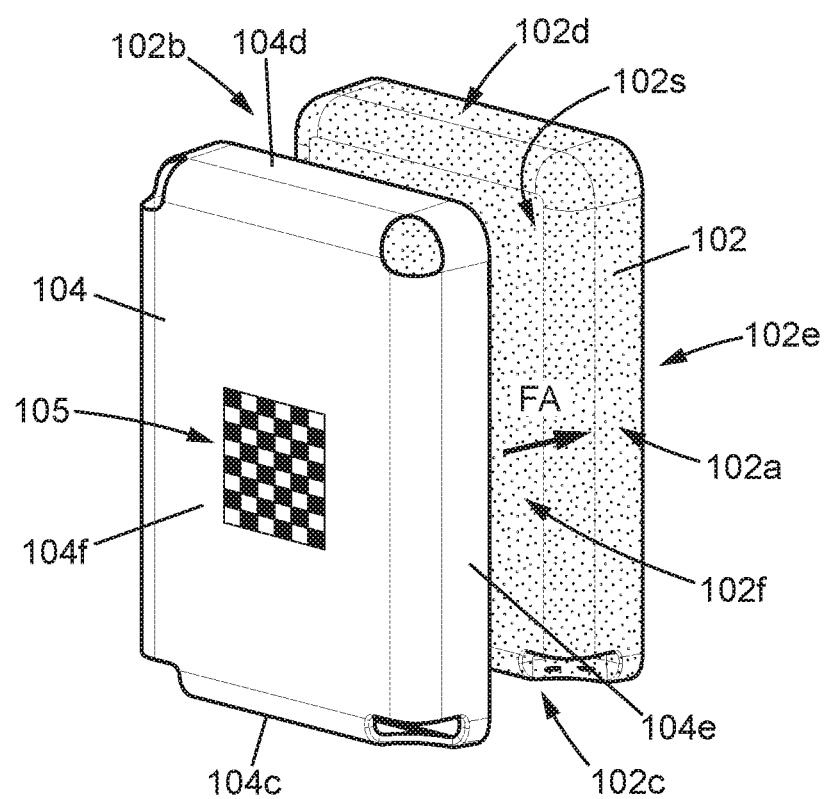
FIG. 5 is an exploded perspective view of the luggage shell of FIG. 4.

According to a first embodiment presented in FIGS. 4 to 6, the luggage shell 100 comprises a single covering sheet 104 adapted to provide maximum coverage of the flat parts and the cylindrical parts of the structure 102.

The initial flat shape of the covering sheet 104 is shown in particular in FIG. 6. This sheet has a general cross shape, with a substantially rectangular central portion corresponding to the main portion 104$f$ intended to be fixed to the external main face 102$f$ of the structure 102.

The main portion 104$f$ then comprises:
- a first bounding edge 105$a$ from which there extends a first side portion 104$a$ intended for covering a side face 102$a$ of the structure 102 so that they together form a side face 3$a$ of the luggage,
- a second bounding edge 105$b$ from which there extends a second side portion 104$b$ intended for covering a side face 102$b$ of the structure 102 so that they together form a side face 3$b$ of the luggage,
- a third bounding edge 105$c$ from which there extends a third side portion 104$c$ intended for covering a side face 102$c$ of the structure 102 so that they together form a side face 3$c$ of the luggage,
- a fourth bounding edge 105$d$ from which there extends a fourth side portion 104$d$ intended for covering a side face 102$d$ of the structure 102 so that they together form a side face 3$d$ of the luggage.

According to this first embodiment, side portions 104$a$ and 104$b$ each comprise two wings which extend laterally from a side bounding edge located at an end remote from the main portion 104$f$. The covering sheet 104 thus comprises four wings 104$_1$, 104$_2$, 104$_3$, and 104$_4$.

The initial shape of the covering sheet 104 shown in FIG. 6 may be firstly created, for example, by a preforming process:
1) a sheet is unwound from a coil of metal;
2) the sheet is possibly treated by anodizing and/or brushing to remove any defect in the appearance of the surface;
3) the sheet is cut to the shape of the appropriate outline, for example that of FIG. 6; this cutting is advantageously done by laser as previously explained;
4) the sheet is possibly decorated by embossing, engraving, or cutting or punching or any other means of shaping. The decoration 105 is thus formed on or in the sheet.

A flat sheet is thus obtained with an outline appropriate for the luggage and possibly with a decoration 105.

The principle of the outline of this covering sheet 104 is that it can be simply folded to cover all the flat and cylindrical portions of the structure 102.

The covering sheet 104 of FIG. 6 may be made and assembled to the structure 102 by various assembly processes.

According to a first variant of the assembly process, the covering sheet 104 is formed directly on the structure 102, by carrying out the following steps:
1) An adhesive is deposited on the outer surface 102$s$ of the structure 102;
2) The main portion 104$f$ of the covering sheet 104 is placed on the external main face 102$f$ of the structure 102 in order to be bonded thereto;
3) The first side portion 104$a$ is applied to side face 102$a$ of the structure 102, for example from the first bounding edge 105$a$ towards the remote end, by applying it firstly to a cylindrical ridge having an angular extent of substantially 90°, then applying it secondly to the flat portion of side face 102$a$;
4) The third side portion 104$c$ is applied to side face 102$c$ of the structure 102, for example in the same manner;
5) Wing 104$_1$ is applied to the structure 102 on a cylindrical ridge having an angular extent of substantially 90° between side face 102$a$ and side face 102$c$;
6) Steps 4) and 5) are repeated for the second side portion 104$b$, the fourth side portion 104$d$, and wings 104$_2$, 104$_3$, and 104$_4$.

According to a second variant of the assembly process, the covering sheet 104 is shaped independently of the structure 102 by carrying out shaping operations on the covering sheet 104 and operations of fixing the covering sheet on the structure 102. In this variant, the shaping operations on the covering sheet can be carried out in parallel with the plastic molding of the structure 102.

The shaping operations comprise the following steps:
1) The first side portion 104$a$ is folded along the first bounding edge 105$a$ into a first cylindrical ridge shape having an angular extent of substantially 90° then into a flat portion intended to correspond to side face 102$a$;
2) The second side portion 104$b$, third side portion 104$c$, fourth side portion 104$d$ are shaped in the same manner as the first side portion 104$a$ in step 1);
3) Wing 104$_1$ is folded along a bounding edge 105$e$ into a first cylindrical ridge shape having an angular extent of substantially 90° and then into a flat portion intended to reach over the third side portion 104$c$;
4) Wings 104$_2$, 104$_3$, and 104$_4$ are shaped in the same manner as wing 104$_1$ in step 3), along respective bounding edges 105$f$, 105$g$, and 105$h$.

At this stage, the covering sheet 104 has a three-dimensional (3D) shape adapted to the structure 102. In other words, it has a complementary or substantially identical shape, as can be seen in FIG. 5.

The fixing operations then comprise the following steps:
1) An adhesive is deposited on the outer surface 102$s$ of the structure 102;
2) The covering sheet 104 is applied to the structure 102 for assembly thereto and is permanently bonded: the covering sheet 104 is mounted by fitting it around the structure 102 by translational displacement of the covering sheet 104 towards the structure 102 as represented by arrow FA of FIG. 5, or vice versa.

In order to ensure high precision and repeatability of the method, the preceding steps may be carried out with the aid of tools for shaping the sections corresponding to the various shapes or shape portions to be formed. Optionally, these operations are mechanized by one or more special machines. It is possible for these operations to be carried out by one or more robots equipped with suitable tools.

Following the above assembly process or in parallel with it, the assembly is completed by a joining process, during which one end of each wing is folded according to the diagram of FIG. 7, also called "hemming", to avoid having an exposed cut edge of the covering sheet 104.

More specifically, this joining process comprises the following steps:
1) folding the end of the wing onto itself over a predetermined width (represented by the dotted line at the end of each wing in FIG. 6), and
2) fixing (for example by gluing or welding or riveting, or a combination of these methods) the previously folded portion of the wing onto a portion that is part of another adjacent portion of the covering sheet 104.

By this joining process, the two cut ends of the covering sheet 104 are entrapped in a joining area S located between the structure 102 and the covering sheet 104, and are not visible.

Thus, in the joining area S, there is a superposition of three thicknesses of the covering sheet 104. This area is therefore mechanically very robust or resistant.

Optionally, the structure 102 comprises a recess around this joining area S of a width substantially equal to or greater than the predetermined width for embedding the "hemming" within the thickness of the structure 102 (not shown).

As represented in FIG. 8, the zipper fastener is mounted on the shell 100, for example by performing the following steps of a fastener mounting process:

1) The edge 100*a* of the previously created assembly, namely the structure 102 covered by the covering sheet 104, is covered by an edge strip 106 in an edge region B and which extends to each side of the previous assembly (internal side and external side of the shell 100);

2) The first strip 12 of the zipper fastener 10 is mounted on the edge strip 106 inside the shell 100;

3) An inner lining 108 is mounted on the first strip 12, for example with an inner fold extending in the edge region B, as shown.

4) The preceding elements, i.e. the edge strip 106, the first strip 12, and the inner lining 108, are assembled by stitching with thread 109 onto the structure 102 and the sheet 104.

The edge strip 106 is made of leather or fabric for example. This edge strip 106 thus protects the edge 100*a* (2*a*; 4*a* respectively) of the shell 100 (2; 4). The thread 109 is for example aramid thread, which is therefore very resistant.

Finally, the uncovered corners of the shell 100 are possibly also covered by another covering such as leather or fabric to protect them and to hide the structure 102, said covering then being advantageously secured by stitching with a highly resistant thread such as aramid thread.

Figure 9:
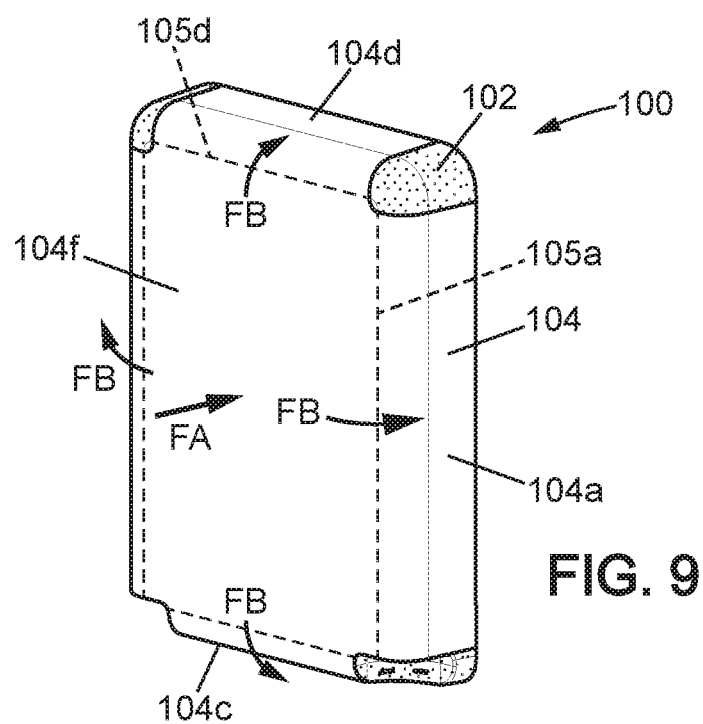
FIG. 9 is a perspective view of a second embodiment of a luggage shell according to the invention.

According to a second embodiment shown in FIG. 9, the luggage shell 100 again comprises a single covering sheet 104. Here the covering sheet 104 is adapted to cover only the flat portions and the cylindrical portions in connection with the main portion 104*f*; in other words adapted to cover the four ridges of the external main face 102*f* of the structure 102. In effect, this second embodiment differs from the first embodiment by the fact that the covering sheet 104 does not comprise any additional wings extending laterally from side portions 104*a* and 104*b*.

The initial flat shape of the covering sheet 104 is a cross shape with a substantially rectangular central portion corresponding to the main portion 104*f*, and intended to be fixed to the external main face 102*f* of the structure 102.

The initial flat shape of the covering sheet 104 may be achieved by the same preforming process as described above for the first embodiment, to obtain a flat sheet with the appropriate outline for the creation of the luggage shell 100 of FIG. 9.

The covering sheet 104 of FIG. 9 may be made and assembled to the structure 102 by various assembly processes similar to those described in the first embodiment, to obtain a luggage shell 100 with a covering sheet 104 fixed to a plastic structure 102. The assembly process of this second embodiment differs in that it does not include the steps relating to the wings, as the flat sheet does not have these wings in the second embodiment. For the same reason, there is no joining process in the second embodiment.

According to the first variant of the assembly process, the covering sheet is shaped directly on the structure 102, by carrying out the following steps:

1) An adhesive is deposited on the outer surface 102*s* of the structure 102;

2) The main portion 104*f* of the covering sheet 104 is placed on the external main face 102*f* of the structure 102 in order to be bonded thereto;

3) The first side portion 104*a* is applied to side face 102*a* of the structure 102, for example from the first bounding edge 105*a* towards the remote end, by applying it firstly to a cylindrical ridge having an angular extent of substantially 90°, then applying it secondly to the flat portion of side face 102*a* (this folding step is illustrated by the arrows FB in FIG. 9);

4) Step 3) is repeated for the second side portion 104*b*, third side portion 103*c*, and fourth side portion 104*d*.

According to the second variant of the assembly process, the covering sheet 104 is shaped independently of the structure 102 by carrying out shaping operations on the covering sheet 104 and operations of fixing the covering sheet 104 on the structure 102. In this variant, the shaping operations on the covering sheet can be carried out in parallel with the plastic molding of the structure 102.

The shaping operations comprise the following steps:

1) The first side portion 104*a* is folded along the first bounding edge 105*a* into a first cylindrical ridge shape having an angular extent of substantially 90°, then into a flat portion intended to correspond to side face 102*a* (this folding step is illustrated by the arrows FB in FIG. 9);

2) The second side portion 104*b*, third side portion 104*c*, fourth side portion 104*d* are shaped in the same manner as the first side portion 104*a* in step 1).

At this stage, the covering sheet 104 has a three-dimensional (3D) shape adapted to the structure 102. In other words, it has a complementary or substantially identical shape, with the exception of the lateral ridges between the side portions.

The fixing operations then comprise the following steps:

1) An adhesive is deposited on the outer surface 102*s* of the structure 102;

2) The covering sheet 104 is applied to the structure 102 for assembly thereto and is permanently bonded: the covering sheet 104 is mounted by fitting it around the structure 102 by translation displacement of the covering sheet 104 towards the structure 102 as represented by arrow FA of FIG. 9, or vice versa.

In order to ensure high precision and repeatability of the process, the preceding steps may be carried out with the aid of tools for shaping the sections corresponding to the various shapes or shape portions to be formed. Optionally, these operations are mechanized by one or more special machines. It is possible for these operations to be carried out by one or more robots equipped with suitable tools.

Next, the zipper fastener 10 may be mounted on the luggage shell 100 in the same manner, meaning by the same fastener mounting process as described above.

The lateral ridges may then possibly be covered by another covering such as leather or fabric to protect them and hide the structure 102, said covering then being advantageously fixed by stitching with a highly resistant thread such as an aramid thread.

Figure 10:
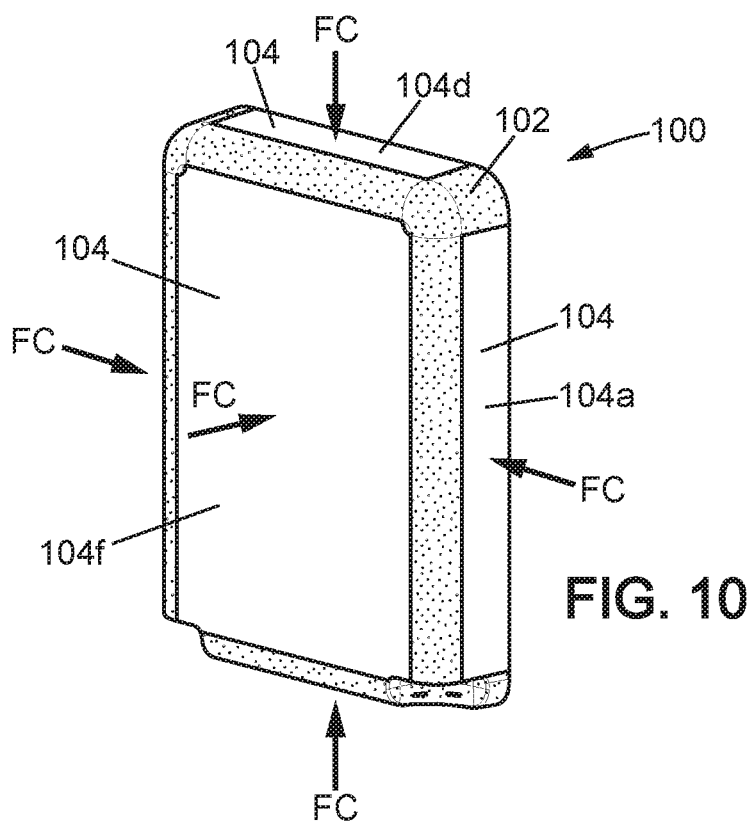
FIG. 10 is a perspective view of a third embodiment of a luggage shell according to the invention.

According to a third embodiment shown in FIG. 10, the luggage shell 100 comprises a plurality of flat covering sheets 104. Here, each covering sheet 104 is adapted for covering the flat part of a single portion of the structure 102; in other words adapted for covering a single portion of one face of the suitcase 1. This third embodiment differs from the previous embodiments in that the covering sheets 104 remain flat and are not folded to fit the rounded ridges of the suitcase edges. These ridges may then possibly be covered by another covering such as leather or fabric in order to protect them and hide the structure 102, said covering then being advantageously fixed by stitching with a highly resistant thread such as aramid thread.

The invention claimed is:

1. A luggage shell comprising:
    a structure having a general shell shape defining an internal volume and formed of a material comprising plastic or a composite material, an outer surface of the structure including a plurality of flat regions and a plurality of curved regions, each curved region comprising a cylindrical ridge having an angular extent of substantially 90°, and
    a single covering sheet fixed on the outer surface of the structure, said covering sheet being of metal and having a thickness of between 25 μm and 1 mm, said covering sheet including a central region, a panel extending away from the central region, and a wing extending from an end of the panel remote from the central region, wherein a distal end of the wing is folded onto itself to form a folded portion,
    wherein the covering sheet is formed by folding a flat sheet having an outline adapted so that, after folding, the covering sheet has a shape substantially identical to the outer surface of the structure,
    wherein the outline is adapted so that, after folding, the covering sheet has a shape which cover seach flat and curved region of the outer surface of the structure, and
    wherein the covering sheet is fixed to the outer surface of the structure.

2. The luggage shell according to claim 1, wherein the covering sheet has a thickness of between 25 μm and 0.6 mm.

3. The luggage shell according to claim 1, wherein the covering sheet is made of a material chosen from a list of metals comprising titanium, stainless steel, and aluminum.

4. The luggage shell according to claim 1, wherein the material of the structure comprises a plastic of the thermoplastic or thermosetting type.

5. The luggage shell according to claim 1, wherein the material of the structure comprises a filler incorporated into the plastic, said filler being in the form of fibers.

6. The luggage shell according to claim 5, wherein the fibers are plastic fibers or glass fibers or carbon fibers.

7. The luggage shell according to claim 1, wherein the outline is a cross shape.

8. A luggage shell according to claim 7, wherein the flat sheet comprises at least:
    a substantially rectangular main portion intended to cover an external main face of the structure, located opposite to an opening of the structure,
    a first side portion extending from the main portion and intended to cover a first side face of the structure;
    a second side portion extending from the main portion and intended to cover a second side face of the structure; and
    at least four wings, each wing extending laterally from an end remote from the main portion, wherein the folded portion is fixed to the second side portion when said flat sheet is folded to form the covering sheet.

9. The luggage shell according to claim 7, wherein the covering sheet is formed by folding prior to being fixed to the structure.

10. The luggage item comprising a first luggage shell according to claim 1.

11. The luggage item according to claim 10 comprising:
    a second luggage shell according to one of claims 1-6, 8-9,
    a hinge device connecting the first luggage shell and the second luggage shell, the second luggage shell being movable relative to the first luggage shell between a closed position and an open position by means of the hinge device,
    a zipper fastener comprising a first strip connected to the first luggage shell, a second strip connected to the second luggage shell, and a slide that is movable along said first and second strips between:
        a fastening position in which the first and second strips are held adjacent to each other, the hinge device then being in the closed position, and
        a releasing position in which the first and second strips are released from one another.

12. The luggage according to claim 2, wherein the covering sheet has a thickness of between 25 μm and 0.3 mm.

* * * * *